United States Patent [19]
de Raucourt

[11] Patent Number: 5,461,269
[45] Date of Patent: Oct. 24, 1995

[54] LIGHTING GENERATOR FOR BICYCLE

[76] Inventor: Jean-Claude de Raucourt, 491 Clinton Street, Toronto, Ontario, Canada, M6G 2Z3

[21] Appl. No.: 330,856
[22] Filed: Oct. 27, 1994
[51] Int. Cl.⁶ ..................................................... H02K 7/10
[52] U.S. Cl. ................................. 310/67 A; 310/75 C
[58] Field of Search ............................. 310/67 A, 75 C, 310/112; 322/1; 362/193

[56] References Cited

U.S. PATENT DOCUMENTS

| | | | |
|---|---|---|---|
| 508,482 | 11/1893 | Mayr | 322/1 |
| 3,884,317 | 5/1975 | Kinzel | 310/67 A |
| 4,691,119 | 9/1987 | McCabria | 310/112 |

FOREIGN PATENT DOCUMENTS

| | | | |
|---|---|---|---|
| 490551 | 2/1953 | Canada | 310/67 A |
| 728469 | 11/1942 | Germany | 310/67 A |

Primary Examiner—Clayton E. LaBalle
Attorney, Agent, or Firm—Jane Parsons

[57] ABSTRACT

An electrical generator system is provided for use with a wheel, for example, a bicycle wheel. A bracket rotating with the wheel carried generator units each having a friction wheel to drive it. A fixed circular disc which is non-rotatable with the wheel is symmetrically arranged in the plane of the wheel. The friction wheels rotate to drive the generator units, the output of which is combined and directed to an appliance such as a lamp.

11 Claims, 5 Drawing Sheets

LIGHTING GENERATOR FOR BICYCLE

BACKGROUND OF THE INVENTION

1. Field of the Invention.

The present invention relates to a generator assembly on a manually powered vehicle wheel, especially a bicycle wheel, to provide electricity to power lighting accessories or other accessories.

2. Description of the Prior Art

Electrical generators for lamps for pedal cycles have been known for a long time. A conventional dynamo may be driven by a friction wheel engaging a tire or rim of a wheel. Such simple dynamos utilizing single generating units, have various disadvantages. For example, wear on the surface of the tire may be appreciable and the continuity of electrical supply to an appliance such as a lamp may be very variable in dependence on the rotation of the wheel.

Over the years, a large number of proposals to alleviate the problems associated with the simple dynamo system have been made. Some of these are exemplified by the disclosures of the following listed patents:

U.S. Pat. No. 4,539,496 issued Sep. 3, 19854 to Thomas et al.

U.S. Pat. No. 4,860,176 issued Aug. 22, 1989 to Bauwens et al.

U.S. Pat. No. 4,775,919 issued Oct. 4, 1988 to Pearsall et al.

U.S. Pat. No. 4,644,203 issued Feb. 17, 1987 to Thomas et al.

U.S. Pat. No. 4,677,328 issued Jun. 30, 1987 issued to Kumakura

U.S. Pat. No. 5,128,840 issued Jul. 7, 1992 to Seki et al.

German Pat. No. 27 29 446 issued Jan. 11, 1979

Japanese Pat. No. 52-9808 issued Jan. 25, 1977

Many proposals have been made to modify the simple dynamo system, many of these proposals have resulted in considerable extra expense without commensurate improvement in performance.

The present inventor has addressed the problems, and, as a result, has devised a modified dynamo system.

SUMMARY OF THE INVENTION

The present invention relies on driving a plurality of electrical generator units through friction wheels which rotate with a bicycle wheel to be driven over the periphery of a fixed disc. It is believed that the use of a plurality of generators alleviates difficulties with discontinuity of supply which might otherwise occur due to temporary or total of a single unit.

Thus, according to the invention, there is provided an electrical generator system for producing electricity in response to rotation of rotation of a wheel having a hub rotatable on a fixed axle, comprising a non-rotatable circular disc fixed on the axle, the disc lying in the plane of the wheel and having a diameter less than the diameter of the wheel; a bracket having a plurality of arms, the bracket being rotatable with the hub, the arms extending generally to the periphery of said non-rotatable disc; at least two of the arms carrying an electrical generator unit having a rotor and a stator, each electrical generator unit having a friction wheel for rotation of its rotor, a periphery of the friction wheel frictionally engaging the periphery of said non-rotatable disc; wiring combining electrical output from the generators and connecting the resulting electrical output to an appliance, e.g. a lamp.

Conveniently each electrical generator unit is a d.c. electrical generator unit.

The wiring for combining electrical output may include a collector disc rotatable with the wheel. A sliding contact for said collector disc is provided and wiring from the contact to the appliance is provided Balance of the wheel should be maintained as far as possible, for example each arm of the bracket has components extending symmetrically to either side of the non-rotatable disc.

BRIEF DESCRIPTION OF THE DRAWINGS

Embodiments of the invention will now be described by way of example with reference to the drawings, in which.

DETAILED DESCRIPTION OF A PREFERRED EMBODIMENT

Figure 1:
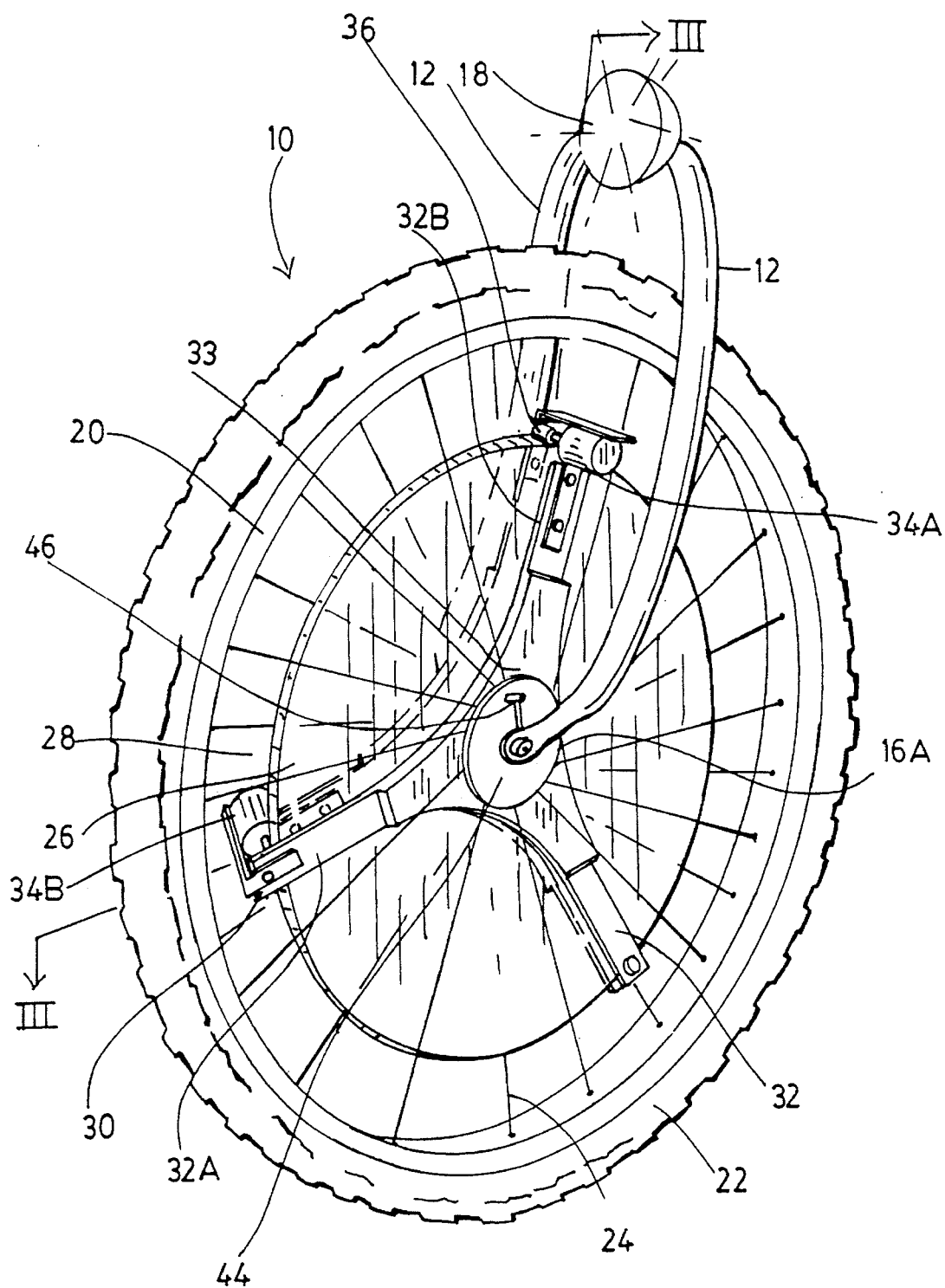
FIG. 1 is a view of a front bicycle wheel fitted with a system according to the present invention and including a from bicycle lamp powered by the system.
Figure 2:
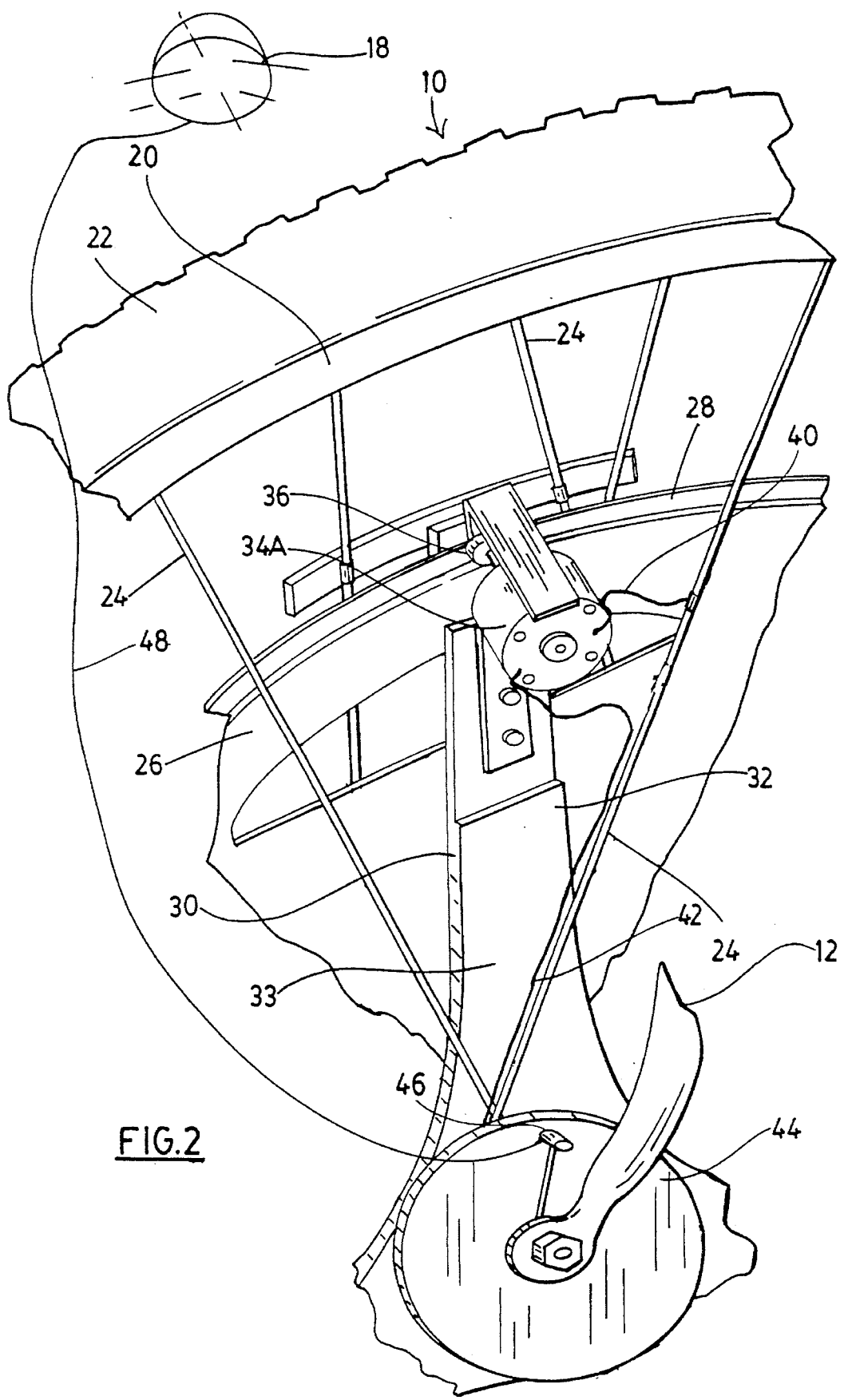
FIG. 2 is an enlarged detail of the wheel of FIG. 1.
Figure 3:
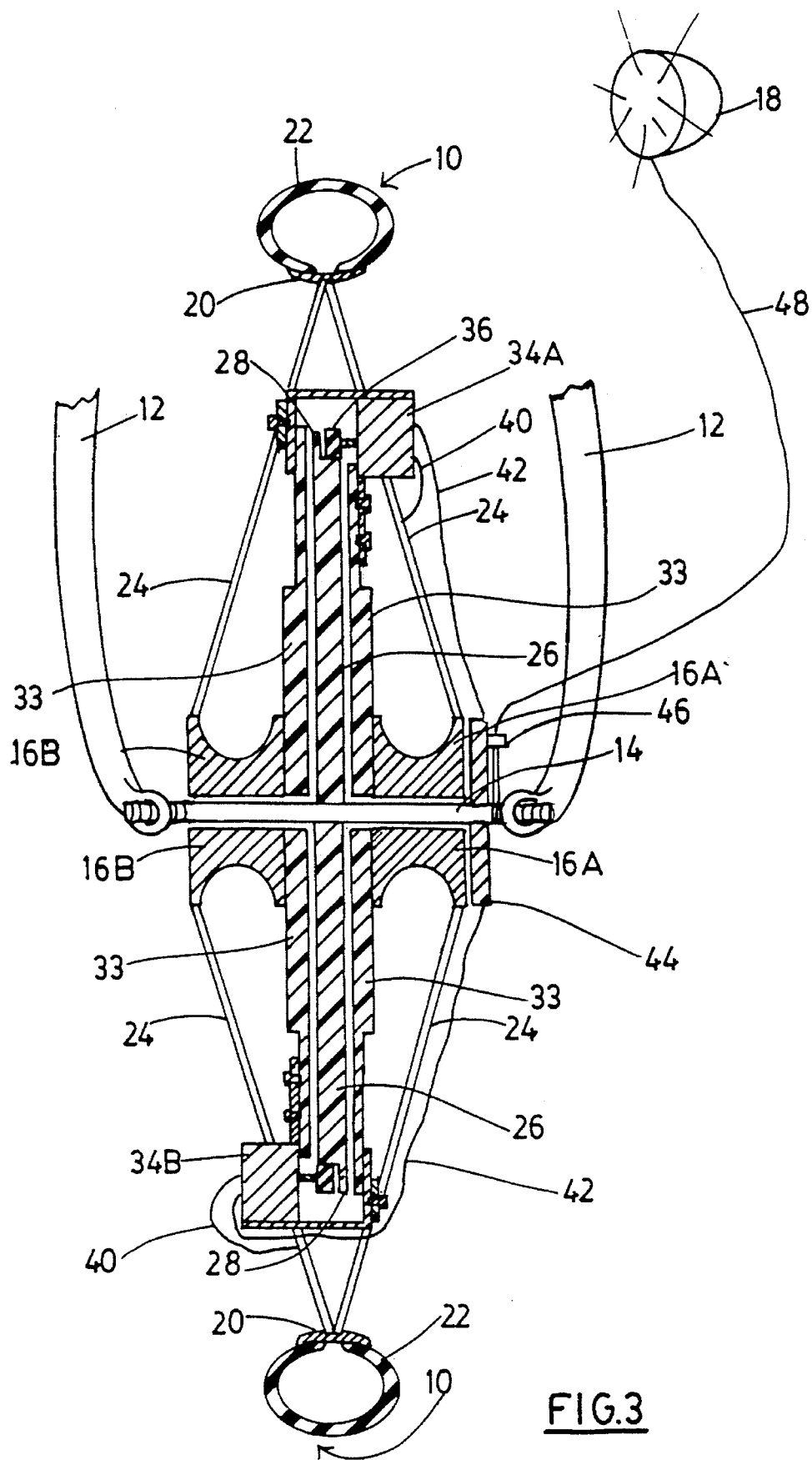
FIG. 3 is a section on the line 3—3 of FIG. 1.

The drawings indicate a front bicycle wheel 10 mounted in the front fork 12 of a bicycle. A rotatable hub 16 of the wheel 10 is mounted on a fixed axle 14. A lamp 18 to direct a beam of light forwardly of the bicycle is mounted above the fork 12.

The bicycle wheel 10 is generally conventional having a rim 20 and a tire 22 and conventionally arranged spokes 24. Wheel 10, is, however, provided with a split hub 16 having symmetrical parts 16A and 16B. The hub parts 16A and 16B are located to either side of a non-rotatable, circular disc 26.

The disc 26 lies in the region between those spokes 24 extending from one end of the hub part 16A and those spokes 24 extending from the opposing end of the other hub part 16B. The periphery 28 of the disc 26 lies inwardly of the rim of the wheel 10. The diameter of the disc 26 should be conveniently as large as possible without fouling of the spokes 24 as they converge together towards the rim 20 of the wheel 10.

A bracket 30 is mounted on the rotatable hub 16 of the wheel 10 for rotation with the wheel. The bracket, as shown, comprises three radially extending arms 32 having components 33 lying symmetrically to each side of non-rotatable disc 26 for optimum balance of wheel 10.

One of the arms 32A carries an electrical generator unit 34A having both a stator and a rotor. Another of the arms 32B carries a second electrical generator unit 34B also having a rotor and a stator. It is to be noted that for optimum balance of wheel 10 generator unit 34A projects in one direction from the plane of non-rotatable disc 26 and the electrical generator 34B projects in the other direction from the plane of non-rotatable disc 26. Again, this is for balance reasons, and, if balance is not to be considered, there is no particular reason why both electrical generators should not project in the same direction. A drive shaft of the rotor of each electrical generator 34A, 34B projects from the respective generator and carries a friction wheel 36 engaging with the periphery of non-rotatable disc 26.

Rotation of wheel 10 and the arms 32 of rotatable bracket 30 therewith will roll the friction wheel 36 over the periphery 28 of rotatable disc 26. The speed of rotation of friction wheel 36 is a function of the circumference of non-rotatable disc 26 and, as a result, the rotation of the rotor of the electrical generator is also a function of the circumference of non-rotatable disc 26. It is therefore clear that the circumference of disc 26 should be as great as possible without fouling the rotation of arms 32 of rotatable bracket 30 and spokes 24 of wheel 10. While two electrical generators 34A, 34B are shown, a greater number of generators is possible as is shown, for example, in FIGS. 5A and 5B. For balance reasons it may be preferable that an even number of generators is chosen so that weight may be distributed evenly to each side of the plane of non-rotatable disc 26 which is also the plane of symmetry of wheel 10. The number of generators which is most preferable is as large as possible, while bearing in mind the extra expense due to the greater number of generators and the extra frictional drag from the rotation wheel 10.

Wiring from each electrical generator is provided to combine output from the electrical generators 34 and connect it to an applicant such as bicycle lamp 18 grounded in any convenient manner. An earth wire 40 from generator may conveniently be grounded to one of the spokes 24. An output wire 42 from each generator 34 may be led along a spoke 24 and connected to a collector disc 44 insulated from ground and rotating with wheel 10 and located to one side of the wheel outwardly of spokes 24. A sliding contact 46 contacts the surface of the disc 44 to pick up from it at all points of its rotation. The contact 46 is connected by wire 48 to lamp 18.

When the generator units 34A and 34B project in different directions the friction wheels 36 of the units will rotate in opposite directions. Care should therefore be taken to connect wiring 40, 42 of respective units so that the output of one unit does not cancel the output of the other.

Figure 4:
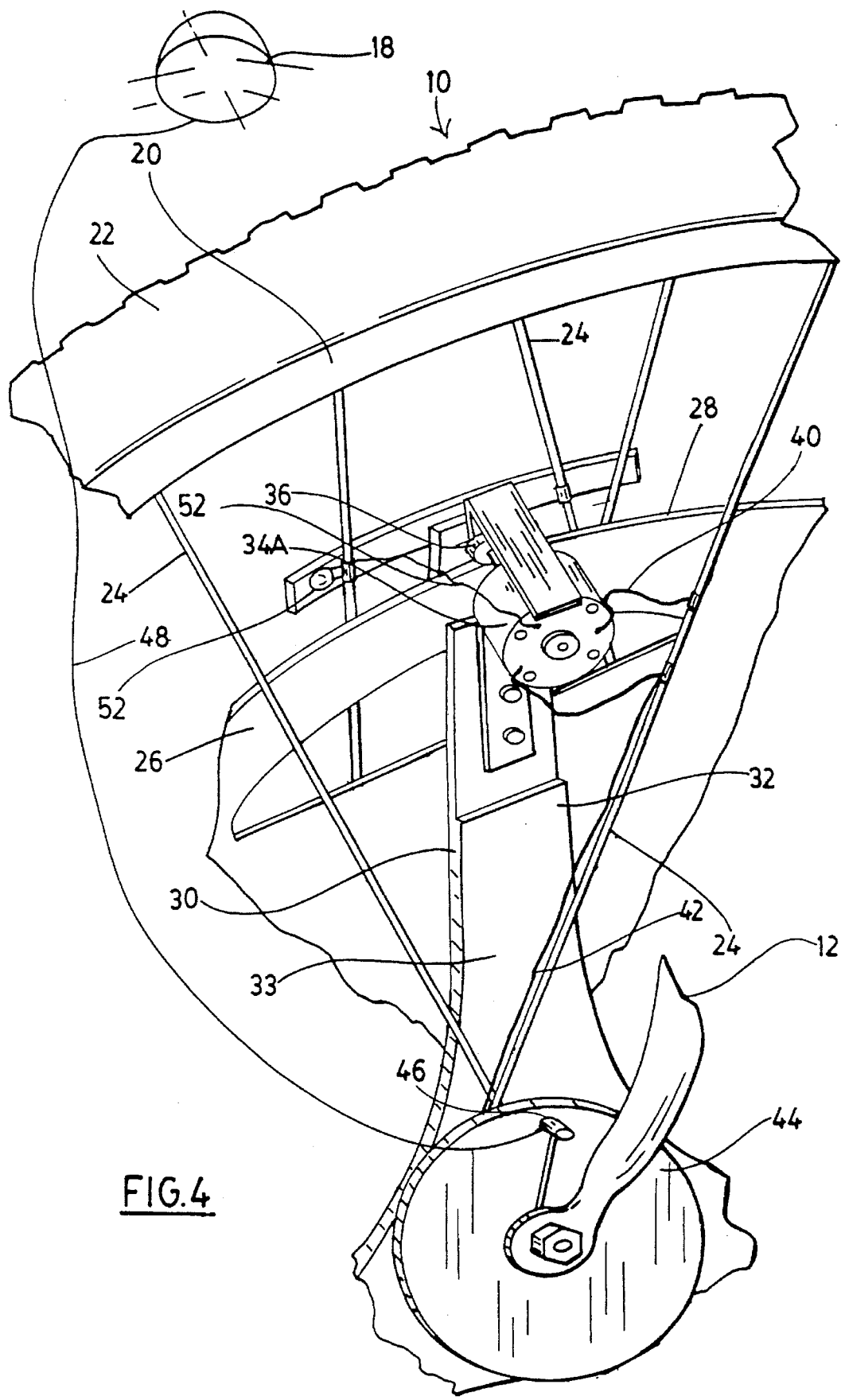
FIG. 4 is a detail of a modification showing a powered lamp mounted on the spokes of the wheel.

FIG. 4 shows an additional embodiment of the invention where additional wiring 50 is provided to additional small lamps 52 which may be used to light conventional reflector devices which are frequently mounted on the spokes of bicycle wheels. This provides visible illumination of such devices even when no incident light is directed to them to be reflected therefrom.

Figure 5A:
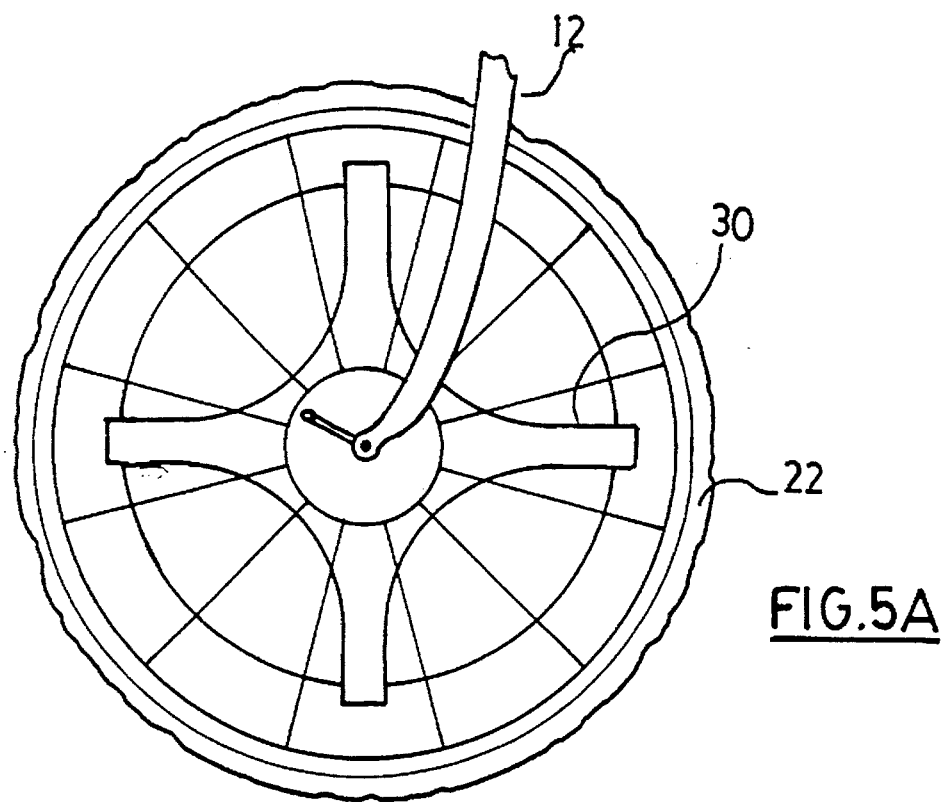
FIG. 5A and 5B show schematic sketches of wheels having modified systems according to the invention.
Figure 5B:
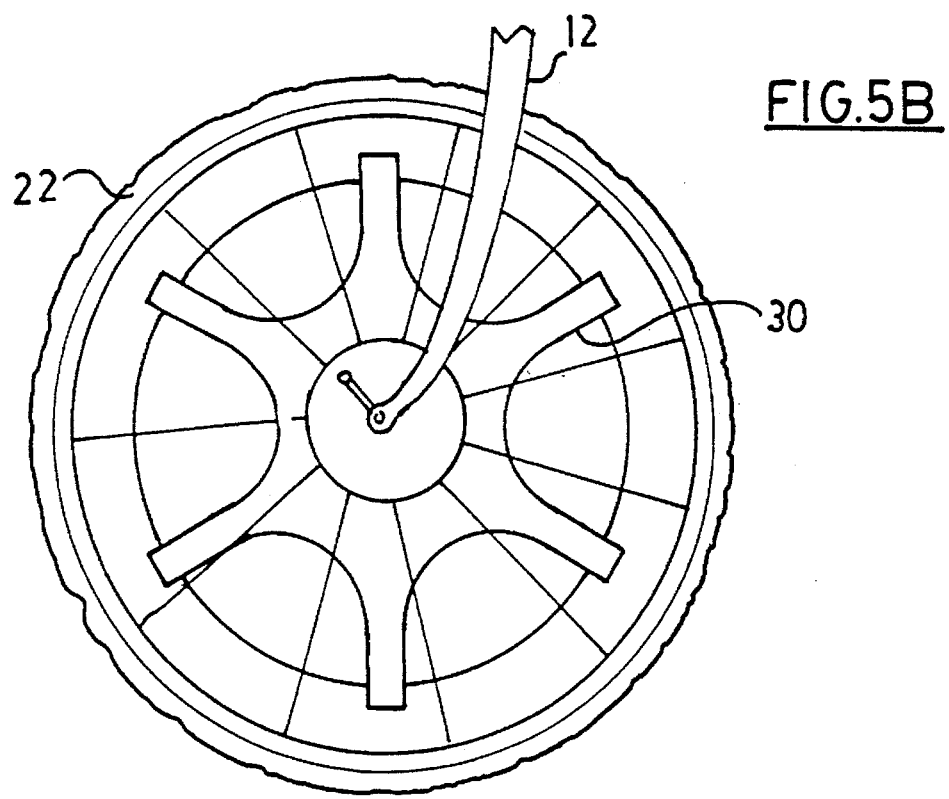

FIGS. 5A and 5B show schematically modified brackets 30 having 4 and 6 arms respectively. Generators 34 may be located on any or all of the arms projecting to either side to maintain balance.

I claim:

1. An electrical generator system for producing electricity in response to rotation of rotation of a wheel having a hub rotatable on a fixed axle, comprising a non-rotatable circular disc fixed on the axle, the disc lying in the plane of the wheel and having a diameter less than the diameter of the wheel;

a bracket having a plurality of arms, the bracket being rotatable with the hub, the arms extending generally to the periphery of said non-rotatable disc;

at least two of the arms carrying an electrical generator unit having a rotor and a stator, each electrical generator unit having a friction wheel for rotation of its rotor, the friction wheel frictionally engaging the periphery of said non-rotatable disc; and wiring combining electrical output from the generators and connecting the resulting electrical output to an appliance.

2. A system as claimed in claim 1 in which each electrical generator unit is a d.c. electrical generator unit.

3. A system as claimed in claim in which wiring for combining electrical output includes a collector disc rotatable with the wheel, and in which a contact for said collector disc is provided in wiring to said appliance.

4. A system as claimed as claimed in claim 1 in which each arm of the bracket has components extending symmetrically to either side of the non-rotatable disc.

5. In combination a wheel having a fixed axle and a hub rotatable thereon, an electrical generator system for producing electricity in response to rotation of the wheel; and an electric appliance operational by use of electrically produced by the electrical generator system; the electrical generator system comprising:

a non-rotatable circular disc fixed on the axle, the disc lying in the plane of the wheel and having a diameter less than the diameter of the wheel;

a bracket having a plurality of arms, the bracket being rotatable with the hub, the arms extending generally to the periphery of said non-rotatable disc;

at least two of the arms carrying an electrical generator unit having a rotor and a stator, each electrical generator unit having a friction wheel rotation of its rotor, the friction wheel itself frictionally engaging the periphery of said non-rotatable disc;

wiring being provided to combine electrical output from the generators and connect the resulting electrical output to the appliance.

6. A combination as claimed in claim 5 in which the appliance is a lamp.

7. A combination as claimed in claim 5 in which the wheel is a spoked wheel and the bracket is fixed with respect to spokes of the wheel.

8. A combination as claimed in 5 in which additional wiring is provided directly from one of the electrical generator units to a lamp located to illuminate an illuminable display fixed to the wheel adjacent to said one electrical generator.

9. A combination as claimed in claim 5 in which each electrical generator is a d.c. electrical generator.

10. A combination as claimed in claim 5 in which the wiring for combining electrical output includes a collector disc rotatable with the wheel, and in which a contact for said collector disc is provided in wiring to said appliance.

11. A combination as claimed in claim 5 in which each arm of the bracket has components extending to either side of the non-rotatable disc.

* * * * *